Jan. 13, 1953  J. J. BLACK  2,625,406
SAFETY COUPLING MECHANISM FOR SEMITRAILERS
Filed May 25, 1950  2 SHEETS—SHEET 1

INVENTOR.
James J. Black
BY
Wood, Arey, Herron & Evans
ATTORNEYS.

Jan. 13, 1953  J. J. BLACK  2,625,406
SAFETY COUPLING MECHANISM FOR SEMITRAILERS
Filed May 25, 1950  2 SHEETS—SHEET 2

INVENTOR.
BY James J. Black
Wood, Arey, Herron & Evans
ATTORNEYS.

Patented Jan. 13, 1953

2,625,406

UNITED STATES PATENT OFFICE 2,625,406

SAFETY COUPLING MECHANISM FOR SEMITRAILERS

James J. Black, Cincinnati, Ohio, assignor, by mesne assignments, to Trailmobile Inc., a corporation of Delaware Application May 25, 1950, Serial No. 164,244

11 Claims. (Cl. 280—33.05)

This invention relates to the fifth wheel structure of highway trailers and is directed in particular to a structure which provides a safety connection between the tractor and trailer to prevent separation of the trailer from the tractor should they become uncoupled accidentally while in motion.

The present structure is intended primarily for semi-trailers which are provided with road wheels at their rearward end and with a fifth wheel at their forward end which rests upon a mating fifth wheel mounted upon the tractor. The superposed fifth wheels are coupled together by means of jaws which engage a king pin and provide an articulated draft connection between the tractor and trailer which permits the tractor to swing angularly with respect to the trailer while supporting upon the fifth wheel the forward weight load of the trailer. The coupling jaw and king pin arrangement is well known in the art, the coupling jaws being, in most instances, constructed and arranged to couple automatically with the king pin when the tractor is backed into position beneath the forward end of the trailer. When the vehicles are to be uncoupled and separated, a manual release is actuated which disengages the jaws from the king pin and thereby permits the tractor to pull away from the trailer. Upon being uncoupled, the forward end of the trailer descends toward the ground and is supported upon a landing gear which may be lowered automatically during the uncoupling operation, or which may be lowered before uncoupling by manual operation of a crank or similar mechanism.

The coupling jaw and king pin arrangement has been almost in universal use for many years and normally is a reliable and safe arrangement, nevertheless, accidental uncoupling of the king pin while the vehicle is in transit has been known to happen. Such accidents may be caused by incomplete coupling, faulty operation due to wear, or by breakage of parts; and although coupling failures are rare, the consequences are apt to be serious in view of the highway speeds of modern transport trailers. In the absence of a safety connection, release of the coupling mechanism will permit the forward end of the trailer to drop from the tractor fifth wheel to the roadway and, if this occurs at high speed, it presents a very serious traffic danger. Therefore, even though the hazard is a remote one, it is desirable in the interest of greater safety to equip semi-trailers with connecting means which supplement the regular coupling mechanism and prevent separation of the trailer from the tractor in the event that the normal coupling between them should fail.

Safety chains can be installed readily upon four wheel trailers by extending them between the spaced tractor and trailer alongside the coupler but it is difficult to apply such a safety connection to a semi-trailer since the fifth wheels of the tractor and trailer occupy an intervening position which interferes; moreover, the tractor fifth wheel necessarily must rotate with respect to the fifth wheel of the trailer in steering and maneuvering the vehicle. In other words, a chain or cable extending from the tractor to the trailer, if short enough to be effective, would limit the rotary movements of the tractor fifth wheel and also would very likely become snagged upon projecting portions of the fifth wheel, thus interfering with the operation of the vehicle. By way of example, the tractor in negotiating sharp turns and in parking, frequently assumes a position at right angles with respect to the trailer; therefore, a chain connection between the two, unless a great deal of slack were provided, would limit such angular movements. If the chain were made long enough for complete angulation, then the chain would be unable to maintain the trailer fifth wheel against displacement relative to the tractor fifth wheel because of excessive slack.

A primary object of the present invention has been to provide a safety mechanism arranged to cooperate with the fifth wheels of a coupled semi-trailer and tractor to provide a direct draft connection between them, the mechanism constituting essentially a swivel ring concentrically related to the superposed fifth wheels which is free to rotate in response to angulation between the tractor and trailer, together with a chain or cable joined to the ring and providing a substantially taut draft connection between the tractor and trailer which is effective upon failure of the coupling mechanism to prevent separation and to maintain the trailer fifth wheel in load bearing position upon the tractor fifth wheel.

Briefly described in its disclosed embodiment, the swivel ring is confined in a channel shaped ring which is secured upon the tractor frame in concentric relationship with the king pin below the plane of the tractor fifth wheel with the swivel ring rotatable relative to its retainer ring. The flexible safety cable or chain has one end anchored to the ring and its trailing or free end detachably connected to the trailer frame by means of a hook or other manually releasable device. The hook is of course disengaged to permit separation of the tractor upon uncoupling and must be reengaged manually when the tractor again is coupled. The safety chain is anchored to the swivel ring at a point related to the rear end of the tractor and since the ring is displaced below the plane of the fifth wheel, the chain extends upwardly and rearwardly at an angle with its trailing upper end anchored to the trailer frame. The disposition and arrangement of the ring and the angulation and substantially taut condition of the chain places the chain beyond the swing of the tractor fifth wheel; thus the chain provides a direct draft connection between the two vehicles which is effective immediately upon failure of the fifth wheel coupling mechanism with very little relative displacement between the upper and lower fifth wheels. This short coupling prevents impacts which would develop upon uncoupling in a chain having a substantial amount of slack, thus providing greater safety and reliability. In one embodiment of the invention, a single chain extends radially from the ring rearwardly to the trailer, in another embodiment, pairs of chains extend from diametrically opposite sides of the ring tangentially to the sides of the trailer. In either arrangement, the tendency for the tractor to separate from the trailer is resisted in tension by the chain or chains along the same longitudinal line as the draft connection ordinarily provided by the king pin and coupling jaws.

Semi-trailers of the class which the invention contemplates are supplied with the king pin mounted either upon the tractor fifth wheel or upon the trailer fifth wheel. The invention is disclosed in conjunction with a trailer having the king pin mounted upon its fifth wheel, cooperating with a tractor fifth wheel which is provided with a pie-shaped slot adapted to receive and guide the king pin and trailer fifth wheel to centered position relative to the tractor fifth wheel as the vehicles are coupled together. In addition, the tractor fifth wheel is adapted to tilt rearwardly upon the tractor to form an inclined ramp adapted to engage the leading edge of the trailer to elevate the trailer to coupling position as the tractor is backed into position beneath it. The swivel ring for this type of fifth wheel construction is mounted upon the tractor chassis concentric with the tractor fifth wheel, the center of the ring corresponding to the center of the king pin in coupled position; and the coupling jaws in this arrangement necessarily are mounted upon the lower or tractor fifth wheel in order to engage the king pin. Thus, the free end of the safety chain swings in an arc centered upon the king pin which corresponds to the swing of the point of the trailer to which it is anchored. However, it will be apparent that the position of the king pin and jaws relative to the upper and lower fifth wheels is immaterial to the operation of the swivel ring and safety chain so long as the ring is mounted concentric to the king pin in position to swivel in response to angular movements of the tractor and trailer. It will be understood that it is contemplated to apply the ring either to the tractor or trailer since the operation in either event is identical; however, the chain will assume a position reversed from that illustrated if the ring is mounted on the trailer.

A further object of the invention has been to provide a chain arrangement which provides a safety connection of the character above outlined but which is capable of holding the trailer against displacement with respect to the tractor along opposite sides; also to provide an arrangement which restrains the trailer against displacement both in forward and rearward directions for vehicles requiring such additional protection. According to the first arrangement, the swivel ring may be provided with a pair of coupling chains or cables which are located at diametrically opposite sides of the ring at a tangent to the ring, as distinguished from the radial disposition of the single chain, previously outlined. The second chain arrangement constitutes two pairs of tangential crossed chains which extend angularly in fore and aft directions on both sides of the trailer, thereby preventing relative movement by resistance in tension in forward and rearward directions. In this instance, failure of the coupling mechanism, which would permit forward movement of the trailer upon the tractor, is resisted by the second angularly related pair of chains with the result that practically no trailer movement upon coupling failure is possible in either direction.

In the embodiment disclosed, the swivel ring is cushioned and lubricated by means of a grease soaked fabric covering which surrounds the ring and provides a bearing surface with respect to the fixed retainer ring. The fabric covering presents a sound insulation by the prevention of metal-to-metal contact and cushions shocks which would otherwise be transmitted to it upon taking the load. The swivel ring is effectively confined in the retainer ring which is channel shaped in cross section with its open side facing outwardly. The retainer ring is securely mounted, preferably by welding it to the vehicle frame or fifth wheel mounting plate, and the swivel ring floats or swivels freely within it in response to swinging movements of the chain or chains. The swivel ring is permanently locked within the retainer ring, being rolled from bar stock to the radius of the retainer with its ends joined by welding to provide a rugged assembly.

Other features and advantages of the invention will be more fully apparent to those skilled in the art from the following detailed description in connection with the drawings illustrating the structure as applied to a semi-trailer.

The present improvement is particularly applicable to semi-trailers which are provided with road wheels at the rearward end, having a fifth wheel at the forward end which rests upon the tractor to provide an articulated draft connection with the tractor as outlined above. The weight load of the forward end of the trailer thus is supported by the tractor fifth wheel which establishes a coupled connection with the trailer. When the trailer is uncoupled and the tractor withdrawn, its forward end is supported by a landing gear or prop mechanism for loading or unloading.

The coupling engagement is established between the tractor and trailer fifth wheels by means of coupling jaws which engage a king pin when the tractor is backed into position with respect to the trailer. In the present disclosure, the tractor is provided with a rocking fifth wheel including coupling jaws and the trailer is provided with a mating fifth wheel and king pin, the arrangement being such that the tractor fifth wheel elevates the forward end of the trailer as it slides into coupling position beneath the trailer, transferring the weight load from the landing gear to the tractor. The coupling jaws are arranged automatically to establish a coupling engagement with the king pin when the final position of the tractor fifth wheel with respect to the trailer fifth wheel is reached. In semi-trailers of this class, the king pin, in some cases, is mounted upon the tractor fifth wheel and the jaws are mounted on the trailer fifth wheel and it will be understood that the safety coupling mechanism can be applied without substantial change to either arrangement. It is also contemplated in certain cases, to mount the swivel ring of the safety mechanism upon the trailer instead of the tractor installation illustrated.

Figure 1:
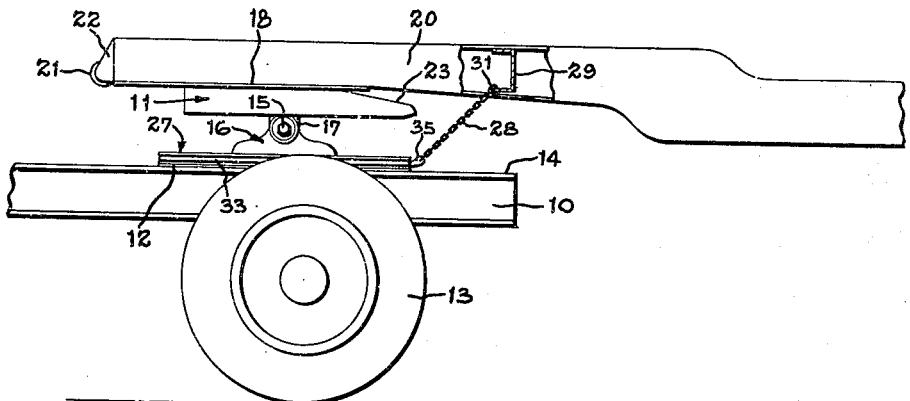
Figure 1 is a fragmentary side elevation showing the forward portion of a semi-trailer in coupled position upon a tractor, with the improved safety mechanism in coupled position between the tractor and trailer.

As disclosed most clearly in Figure 1, the rearward end of the tractor 10 is provided with a fifth wheel indicated generally at 11 which is mounted upon a corrugated plate 12 supported above the road wheels 13 at a slight elevation above the chassis 14. The fifth wheel 11 is of the type known as a rocking fifth wheel, for which purpose the assembly is pivotally mounted upon a bolt 15 traversing a pair of brackets 16 which are mounted upon the plate 12. The fifth wheel includes spaced mounting lugs 17—17 straddling the brackets 16 in the manner shown in broken lines in Figure 2. As shown in Figure 1, the trailer fifth wheel 18 rests directly upon the surface of the tractor fifth wheel 11 and consists generally of a flat plate welded directly to the undersurface of the trailer chassis 20. The forward end of the trailer chassis includes rollers 21 mounted in brackets 22 and adapted to engage the skid portion 23 of the tractor fifth wheel during the coupling operation. The tractor fifth wheel 11 pivots upon its mounting bolt 15 to an inclined position when the vehicles are uncoupled, thus providing a ramp for engagement by the rollers 21 to elevate the front end of the trailer from its landing gear during the coupling operation.

Figure 2:
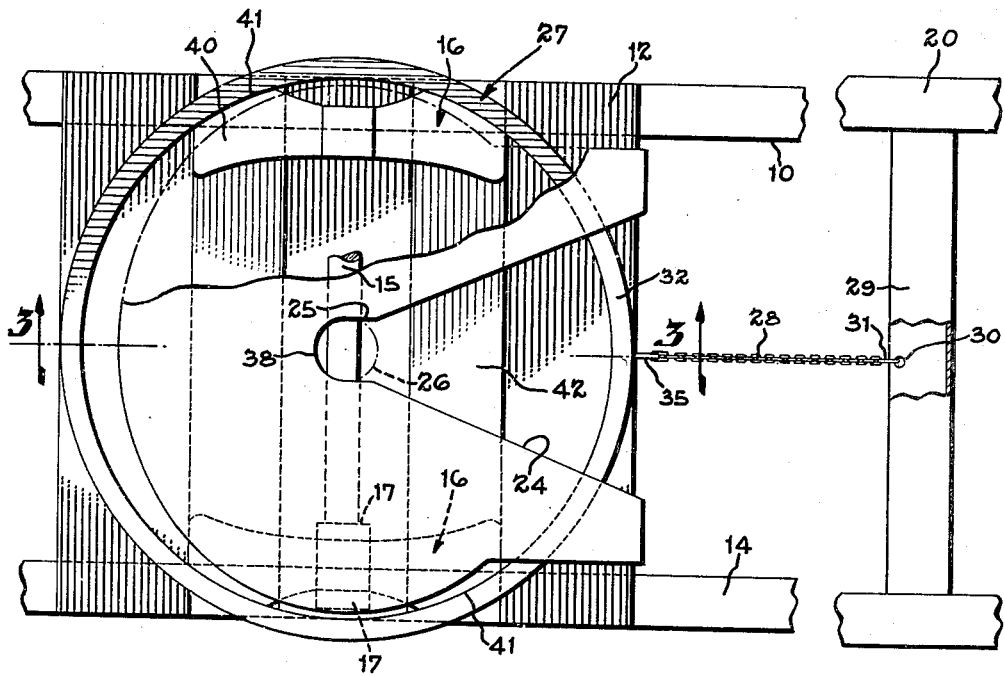
Figure 2 is an enlarged fragmentary top plan view of the structure disclosed in Figure 1, further detailing the relationship of the safety mechanism with respect to the tractor fifth wheel, a portion of the trailer being shown connected to the chain.

In the present structure, the king pin is mounted upon the trailer fifth wheel 18 and, in order to guide the trailer transversely during coupling movement, the tractor fifth wheel is provided with a pie-shaped opening 24 (Figure 2) extending from its rearward edge approximately to the center of the fifth wheel and terminating in a semi-circular opening 25 adapted to encircle the king pin in coupled position. Since the coupling jaws and king pin do not form an essential part of the present invention, a disclosure of them has been omitted from the specification and drawings, the king pin position being indicated in broken lines at 26 in its coupled position. When the tractor and trailer fifth wheels are in coupled position, as shown in Figures 1 and 2, the coupling jaws which, in the present instance, are carried by the tractor fifth wheel, engage the king pin and provide a pivotal connection between them. This permits the tractor fifth wheel to swivel with respect to the trailer fifth wheel in response to the steering movements of the tractor when the vehicle is in motion.

When the coupled vehicle is in transit on the highway, the relative movements between the two fifth wheels due to steering are relatively slight; however, in maneuvering the vehicle through traffic and in parking it, the relative movements are considerably greater, the tractor frequently being parked at right angles to the trailer during loading and unloading. It will be apparent, therefore, that a safety chain which couples the tractor directly to the trailer necessarily would require sufficient slack to permit such movements and the slack chain would be ineffective to maintain the tractor fifth wheel in supported position upon the trailer fifth wheel. Furthermore, such a chain or cable arrangement would be likely to become snagged by the skid portion 23 of the tractor fifth wheel when it swivels in response to steering.

In the present structure, the safety chain provides a short coupling between the vehicles with just sufficient slack to permit the chain to be hooked or otherwise secured to the trailer chassis when the vehicles are in final coupled position but insufficient to allow an undesirable amount of slack to exist. For this purpose, one end of the chain which is carried by the tractor is mounted upon a ring which is concentric to the axis of the king pin, the ring being arranged to swivel in response to turning movements of the tractor, thereby maintaining its radial relationship with the trailer. In other words, the tractor fifth wheel is free to swivel with respect to the ring and its safety chain which extends to the trailer, thus maintaining constantly a positive coupling between the tractor and trailer. Should the coupling engagement between the jaws and king pin fail, the safety chain and its ring hold the trailer fifth wheel against shifting from the tractor fifth wheel with very little relative displacement. In the absence of the safety chain, uncoupling or failure of the mechanism would permit the trailer to slide from the tractor fifth wheel, allowing the front end of the trailer to fall to the roadway causing damage and the likelihood of a serious traffic accident.

Described in detail with reference to Figure 2, the safety chain comprises a swivel ring assembly indicated generally at 27 which is anchored upon the fifth wheel mounting plate 12 concentrically with respect to the king pin. A coupling chain or cable 28 is anchored to the swivel ring with its opposite end coupled to a cross member 29 of the trailer chassis. As shown, the cross member is channel shaped in cross section, its lower web having a hole 30 which is engaged by a hook 31 secured upon the free end of the chain. As detailed in Figure 4, the swivel ring assembly consists of a retainer ring 32, channel shaped in cross section, having its open side facing outwardly. The swivel ring 33 is confined within but free to rotate with respect to the retainer ring. The swivel ring 33 may be formed from round steel stock, rolled to the diameter of the retainer ring and surrounded by a pliable covering 34 arranged to cushion and lubricate the ring 33 which respect to the bearing surfaces of channel 32 and also to prevent rattle and noise. The covering 34 may consist of cotton hose which is grease soaked for lubricating purposes.

Figure 4:
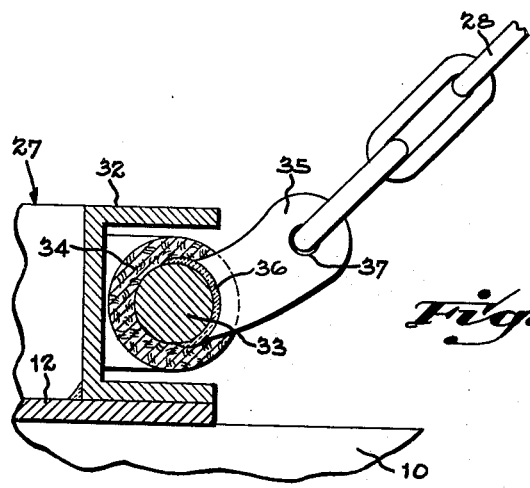
Figure 4 is an enlarged sectional view taken from Figure 3 detailing the channel shaped retainer ring, swivel ring, and the attachment of the safety chain to the ring.

In its preferred construction, the ends of the ring 33 are joined at the point of connection of a lug 35 which anchors the end of chain 28, as shown in Figure 4. The ends of the ring are joined together and to the lug preferably by welding, as indicated at 36, with the hose 34 applied before welding. The chain or cable 28 is sufficiently strong to resist the maximum impact which may be encountered should the tractor become uncoupled from the trailer. It will be noted in Figures 2 and 4, that lug 35 extends through the open side of the retainer ring in a radial position with its outer end clear of the channel to prevent chafing and interference between the chain and channel during rotary movements of the chain with respect to the ring. The outer end of lug 35 is provided with an eye 37 for anchoring the end of the chain and the hook 31 preferably includes a similar eye for attachment to the free end of the chain. It will be evident that other means than the hook 31 may be provided for coupling the free end of the chain to the trailer, for example, a clevis and pin arrangement may in certain installations be of advantage. It will also be understood that it is contemplated to use cables and equivalent flexible connectors in place of the chain 28 according to the requirements of various installations.

As shown in Figure 1, the chain 28 provides a direct connection between the tractor and trailer, being arranged to resist in tension any relative movement of the tractor away from the trailer. It will be apparent also that the angular disposition of the chain from the swivel ring to the trailer disposes the chain clear of the ends of the skids 23 of the tractor fifth wheel such that there is possible no interference or snagging between the skids and chain during turning movements of the fifth wheel. In this arrangement, relative forward movement between the trailer and tractor is resisted by engagement of the king pin 26 against the forward end of the fifth wheel opening 25, while movement in the opposite or rearward direction is resisted by chain 28. It will be apparent that the structure will operate in the same manner whether the king pin is mounted upon the tractor or trailer. Should the coupling mechanism fail, there will be a slight displacement between the upper and lower fifth wheels due to a slight amount of slack which exists in chain 28 to permit the hook 31 to be applied to the channel; however, by virtue of the fabric covering 34, the shock which may occur is cushioned by the covering to prevent breakage of the parts. As shown in Figure 4, there is preferably a clearance provided between the swivel ring and the bearing surfaces of the retainer ring such that the swivel ring floats to a limited extent radially and also vertically with respect to the retainer ring. This insures freedom of movement during operation and allows the driver to swivel the ring easily in coupling the chain to the trailer.

Figure 3:
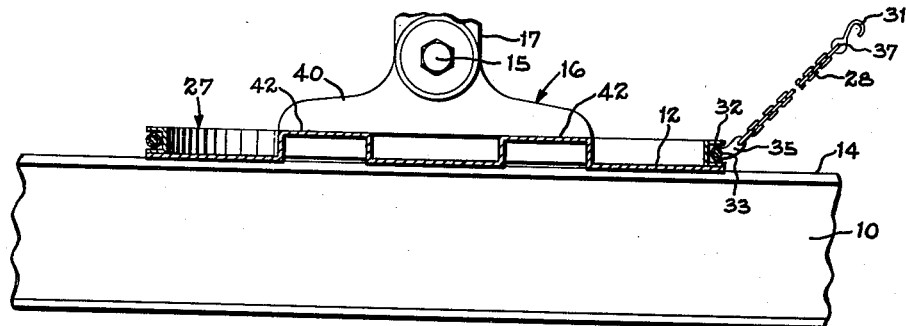
Figure 3 is a sectional view taken on line 3—3, Figure 2, detailing the mounting of the tractor fifth wheel together with the mounting of the swivel ring assembly and safety chain.

In the arrangement shown in Figures 1, 2 and 3, the retainer ring 32 is secured to the tractor preferably by welding it directly to the corrugated plate 12 with the ring encircling the mounting feet 40 of the brackets 16—16. The outer ends 41 of the mounting feet are rounded to a radius corresponding to the retainer ring and the ends of the corrugations 42—42 are cut away to the radius of the ring so as to seat the ring upon the surface of plate 12 below the tops of the corrugations as shown in Figure 3. This provides a secure attachment of the retainer ring to enable it to resist the stresses transmitted to it in case of failure of the standard coupling mechanism. Under ordinary conditions the swivel ring of course performs no work and merely swivels in response to the angulations between the tractor and trailer with the chain 28 substantially in a radial position, as shown. Upon coupling failure, the chain resists separation of the fifth wheels in a radial direction substantially along the same longitudinal axis as the draft connection normally provided by the king pin so as to preserve as nearly as possible the stability of the vehicle until it can safely be brought to a stop.

Figures 5, 6:
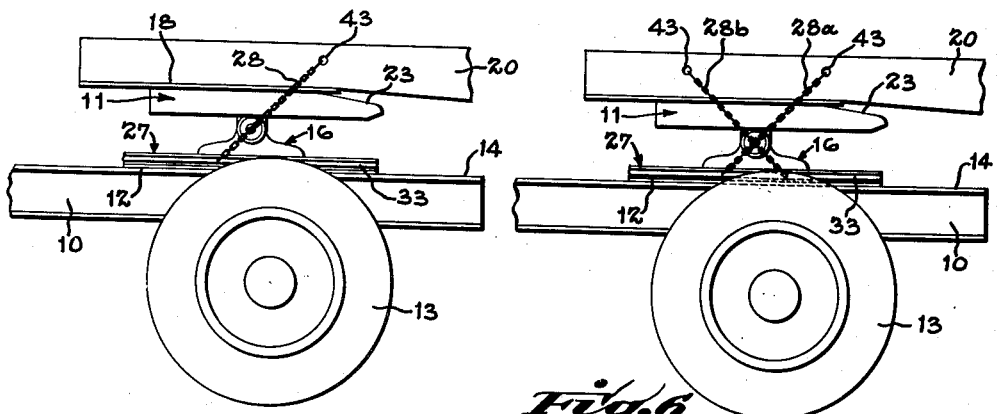
Figure 5 illustrates diagrammatically a safety chain arrangement which utilizes a pair of chains located at opposite sides of the vehicle applied to the swivel ring disclosed in Figures 1 and 2, as a modification thereof.
Figure 6 is a view showing a further modification of the arrangement shown in Figure 5, in this instance, there being provided pairs of crossed chains at opposite sides of the vehicle which are arranged to restrain the trailer against movement in forward and reverse directions relative to the tractor.

In the modified arrangements disclosed in Figures 5 and 6, the structure of the ring and chain and its relationship with the tractor fifth wheel is substantially the same as above described. In the form shown in Figure 5, the single chain 28 is replaced with a pair of chains which are located at opposite sides of the fifth wheel instead of being related in trailing relationship. In this arrangement, the relative rotary movements between the fifth wheels is transmitted in tangent directions to the swivel ring and the resistance to separation is balanced at opposite sides instead of radially. In this case, the free ends of the chains are anchored in holes 43 formed in the longitudinal channels 20 at the forward end of the trailer chassis.

In the modified arrangement disclosed in Figure 6, the ring structure and its relationship to the fifth wheel also is identical to that previously disclosed except that pairs of chains are applied in crossed relationship at the opposite sides of the swivel ring. By this arrangement, the chain indicated at 28a resists rearward movement of the trailer with respect to the tractor while the chain indicated at 28b resists forward movement of the trailer. The chains thus cooperate to resist displacement of the trailer fifth wheel not only in fore and aft directions, but also by virtue of their crossed tangent relationship, prevent lateral displacement as well. This structure is intended for installations which require additional protection, for example, heavy duty vehicles and also for installation requiring protection in case of complete failure of the coupling mechanism, such as breakage of the king pin, which would otherwise permit forward movement of the trailer toward the tractor cab.

Having described my invention, I claim:

1. A safety mechanism adapted to be installed upon a vehicle combination having coupling mechanism comprising, a retainer ring adapted to be secured to one of the vehicles in a position concentric to the coupling mechanism, a swivel ring rotatably journalled within the retaining ring, a connecting member having an end secured to the swivel ring, and a connecting device mounted on the free end of the connecting member adapted to be connected to the other of said vehicles to provide a draft connection between the vehicles which is operable to prevent separation thereof upon failure of the coupling mechanism of the vehicles.

2. A safety mechanism adapted to be installed upon a vehicle combination having coupling mechanism comprising, a retainer ring adapted to be secured to one of the vehicles in a position concentric to the coupling mechanism, a swivel ring rotatably journalled within the retaining ring, a pliable sheath surrounding the swivel ring and adapted to cushion the swivel ring and to present a bearing surface with respect to the retainer ring, a connecting member having an end secured to the swivel ring, and a connecting device mounted on the free end of the connecting member adapted to be connected to the other of said vehicles to provide a draft connection between the vehicles which is operable to prevent separation thereof upon failure of the coupling mechanism of the vehicles.

3. A safety mechanism adapted to be installed upon a vehicle combination having coupling mechanism comprising, a retainer ring having a channel shaped cross section adapted to be mounted on one of said vehicles concentric to the coupling mechanism, a swivel ring rotatably journalled within the retainer ring, a lug secured to the swivel ring and extending radially therefrom beyond the open side of the retainer ring, a connecting member having an end secured to the said lug, and a connecting device mounted on the free end of the connecting member adapted to be connected to the other of said vehicles to provide a draft connection between the vehicles operable to prevent separation thereof upon failure of the coupling mechanism of the vehicles.

4. In a tractor-trailer combination consisting of tractor and trailer vehicles having mating fifth wheels including a king pin and cooperating coupling jaws, a mechanism adapted to provide a safety draft connection between the tractor and trailer supplemental to the draft connection established by the king pin and coupling jaws comprising, a swivel ring assembly mounted upon one of said vehicles in a plane displaced substantially parallel to the fifth wheel of the vehicle and adapted to rotate in concentric relationship with the said king pin, connecting means secured to the swivel ring assembly and extending to the other of said vehicles to provide a draft connection therebetween which is effective upon failure of the coupling engagement of the king pin and coupling jaws to maintain the said fifth wheels in mating relationship.

5. In a tractor fifth wheel adapted to provide a draft connection with the mating fifth wheel of a semi-trailer, the said fifth wheels including respectively a king pin and coupling jaw adapted to provide a primary draft connection between the vehicles, a secondary coupling mechanism adapted to provide a safety connection between the tractor and trailer comprising, a retainer ring mounted upon the tractor below the plane of the tractor fifth wheel, the said retainer ring being concentric with the center of the fifth wheel and having a channel shaped cross section, a swivel ring loosely confined within and rotatable relative to the retainer ring, a connector having one end secured to the swivel ring, and a coupling device secured upon the opposite end of the connector adapted to be connected to a semi-trailer when the same is in coupled position with respect to the tractor to maintain the trailer fifth wheel in mating position upon the tractor fifth wheel upon failure of the primary draft connection.

6. In a tractor-trailer combination having a pair of mating fifth wheels mounted upon the tractor and trailer respectively adapted to support the forward end of the trailer and having coupling means including a jaw and a king pin associated with the said fifth wheels to provide a draft connection therebetween, means for providing a safety connection between the tractor and trailer to prevent separation thereof upon accidental uncoupling of the coupling means comprising, a swivel ring mounted relative to the fifth wheel of one of the vehicles, the said swivel ring being disposed concentric with and being rotatable relative to the fifth wheel with which it is associated, a flexible connector having an end secured to the swivel ring, a coupling device secured upon the free end of the flexible connector, and means mounted upon the other of said vehicles adapted to receive the coupling device of the free end of the flexible connector with the connector extending radially from the swivel ring to its point of connection to the other of said vehicles adapting the swivel ring to rotate in unison with the connected vehicle relative to the fifth wheel with which it is associated and providing a draft connection upon failure of the fifth wheel coupling means.

7. In a tractor fifth wheel adapted to provide a draft connection with the mating fifth wheel of a semi-trailer, the said fifth wheels including respectively a king pin and coupling jaw adapted to provide a primary draft connection between the vehicles, a secondary coupling mechanism adapted to provide a safety connection between and tractor and trailer comprising, a retainer ring mounted upon the tractor below the plane of the tractor fifth wheel, the said retainer ring being concentric with the center of the fifth wheel and being substantially of the same diameter as the fifth wheel, a swivel ring confined within the retainer ring and rotatable relative to the retainer ring, a connector having an end secured to the swivel ring, and a coupling device secured upon the free end of the connector adapted to be connected to a semi-trailer when the same is in coupled position with respect to the tractor, the connector being arranged to extend radially with respect to the swivel ring and at an angle upwardly from the swivel ring in a position displaced from the tractor fifth wheel to eliminate interference upon rotary movements of the tractor fifth wheel.

8. In a tractor-trailer combination including a tractor fifth wheel, a trailer fifth wheel adapted to rest upon the tractor fifth wheel, a king pin and coupling jaw adapted to provide a primary draft connection between the tractor and trailer, a secondary coupling mechanism adapted to prevent separation of the vehicles upon failure of the primary draft connection comprising, a swivel ring mounted upon the tractor concentric to the king pin, a pair of flexible connectors secured to the swivel ring at opposite sides thereof, the said flexible connectors extending rearwardly along the trailer at opposite sides of the trailer, and means for securing the free ends of the flexible connecting elements to the trailer at opposite sides thereof.

9. In a tractor-trailer combination including a tractor fifth wheel, a trailer fifth wheel adapted to rest upon the tractor fifth wheel, a king pin and coupling jaw adapted to provide a primary draft connection between the tractor and trailer, a secondary coupling mechanism adapted to prevent separation of the vehicles upon failure of the primary draft connection comprising, a retainer ring mounted upon the tractor below the plane of the tractor fifth wheel and concentric therewith, a swivel ring rotatably confined within the retainer ring, a pair of connectors having their ends secured upon the swivel ring at opposite sides thereof, the said connectors being disposed substantially in tangential relationship with the swivel ring and extending upwardly therefrom outwardly in angular relationship along the trailer on opposite sides of the trailer, connecting devices secured upon the opposite ends of the connectors to provide a draft connection with the trailer on opposite sides of the trailer, the connectors by their outward angular relationship being spaced from the tractor fifth wheel adapting the tractor fifth wheel to rotate with respect to the connectors without interference.

10. In a tractor-trailer combination consisting of a tractor having a fifth wheel and a semi-trailer having a mating fifth wheel adapted to rest in superposed relationship upon the tractor fifth wheel and including a coupling mechanism arranged to provide a draft connection therebetween, a mechanism adapted to provide a supplemental safety coupling between the tractor and trailer comprising, a rotary member mounted upon the tractor for swinging movements relative to the coupling mechanism, a pair of flexible connectors secured to the sides of the rotary member adapted to swing in concentric relationship to the coupling mechanism, a second pair of flexible connectors secured to the sides of the rotary member and disposed substantially at right angles to the first pair, and means on the opposite ends of said angularly related connectors adapted to be secured to the trailer to provide a direct connection between the tractor and trailer in opposite directions to maintain the superposed relationship of the fifth wheels upon failure of the coupling mechanism.

11. In a tractor-trailer combination consisting of a tractor having a fifth wheel and a semi-trailer having a mating fifth wheel adapted to rest in superposed relationship upon the tractor fifth wheel and including a king pin and cooperating coupling jaws mounted upon the respective fifth wheels to provide a draft connection therebetween, a mechanism adapted to provide a supplemental safety coupling between the tractor and trailer comprising, a swivel ring mounted upon the tractor below the tractor fifth wheel and adapted to rotate upon a center corresponding to the king pin, a pair of connectors having their ends secured at longitudinally spaced points to the sides of the swivel ring for movements relative to the axis of the king pin, a second pair of connectors having their ends secured to the sides of the swivel ring at longitudinally spaced points and disposed substantially at right angles to the first pair, coupling devices on the opposite ends of said angularly related connectors adapted to be secured to the trailer, the said connectors being adapted to provide a direct connection between the tractor and trailer in fore and aft directions to maintain the superposed relationship of the fiifth wheels upon failure of the said king pin and coupling jaws.

JAMES J. BLACK.

REFERENCES CITED

The following references are of record in the file of this patent:

UNITED STATES PATENTS

| Number | Name | Date |
|---|---|---|
| 1,479,828 | Morrison | Jan. 8, 1924 |
| 2,069,928 | Runyan | Feb. 9, 1937 |